United States Patent [19]

Mathias et al.

[11] 4,078,195
[45] Mar. 7, 1978

[54] ADAPTIVE CONTROL SYSTEM FOR NUMERICALLY CONTROLLED MACHINE TOOLS

[75] Inventors: Richard A. Mathias, Renton; Lyle C. Adams, Maple Valley; Edward N. Miller, Seattle, all of Wash.

[73] Assignee: Macotech Corporation, Seattle, Wash.

[21] Appl. No.: 648,640

[22] Filed: Jan. 13, 1976

[51] Int. Cl.² ............................................. G05B 13/00
[52] U.S. Cl. .................................. 318/561; 318/571; 364/105; 364/474
[58] Field of Search .............. 318/561, 571, 590, 591, 318/39; 235/150.1, 151.1, 151.11

[56] References Cited

U.S. PATENT DOCUMENTS

| 3,622,767 | 11/1971 | Koepcke | 235/150.1 |
| 3,634,664 | 1/1972 | Valek | 318/561 X |
| 3,665,493 | 5/1972 | Glowzewski et al. | 318/571 X |
| 3,784,798 | 1/1974 | Beadle et al. | 235/151.11 |
| 3,986,010 | 10/1976 | Lankford et al. | 235/151.11 |

Primary Examiner—Robert K. Schaefer
Assistant Examiner—John J. Feldhaus
Attorney, Agent, or Firm—Christensen, O'Connor, Garrison & Havelka

[57] ABSTRACT

Prior art adaptive control systems for numerically-controlled milling machines are first discussed in which N/C instructions and adaptive control system data are obtained and stored in a storage medium utilizing a software routine which takes into consideration parameters of the milling process and parameters of a specific milling machine. The instructions and data command, for sequential steps in the milling process, such items as spindle position, feedrate and reference milling forces and are supplied to an N/C unit and to the adaptive control system at the milling machine to automatically control the milling process. The adaptive control system includes a milling force sensor and functions to override the commanded feedrate on comparison of the actual milling forces during the process with the reference milling forces. An improvement is then discussed which modifies the adaptive control system data so that the data can be used on any milling machine having an N/C unit capable of responding to the N/C storage medium in which the N/C instructions and adaptive control system data are stored. A set of universal adaptive control variables are included in the adaptive control data. The adaptive control system at the milling machine is modified to respond to these universal adaptive control variables and further to internally store machine constants for the specific milling machine with which the adaptive control system is utilized. The improved adaptive control system then recomputes the adaptive control data including reference milling forces in accordance with the universal adaptive control variables and the machine constants and utilizes the recomputed adaptive control system data to override where necessary the commanded feedrate. In addition, provision is made in the improved adaptive control system for further modifying the adaptive control system data by operator-entered manual process control inputs. Applications of such improved adaptive control systems to numerically-controlled machine tools other than milling machines are also discussed.

23 Claims, 7 Drawing Figures

PRIOR ART

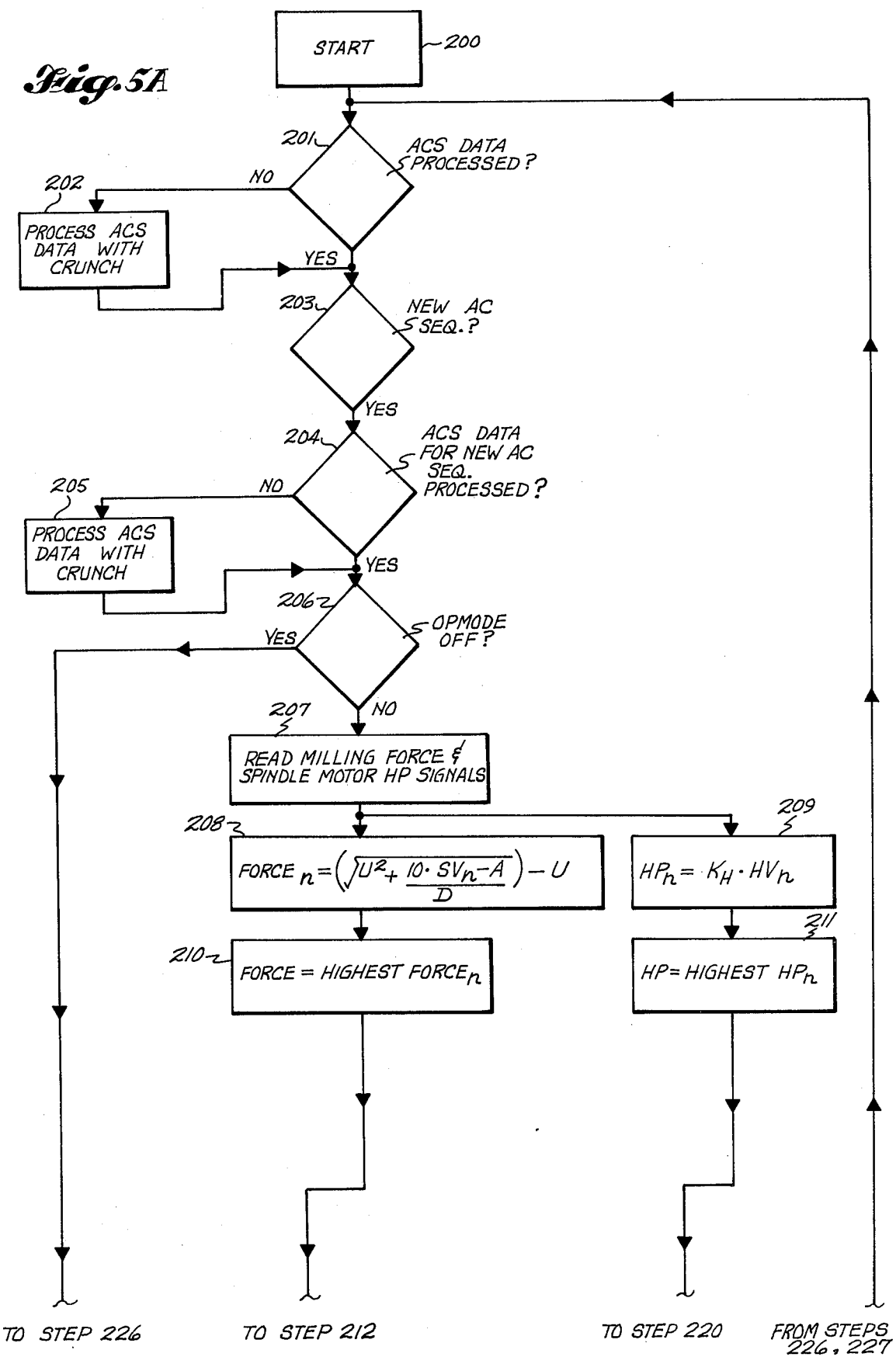

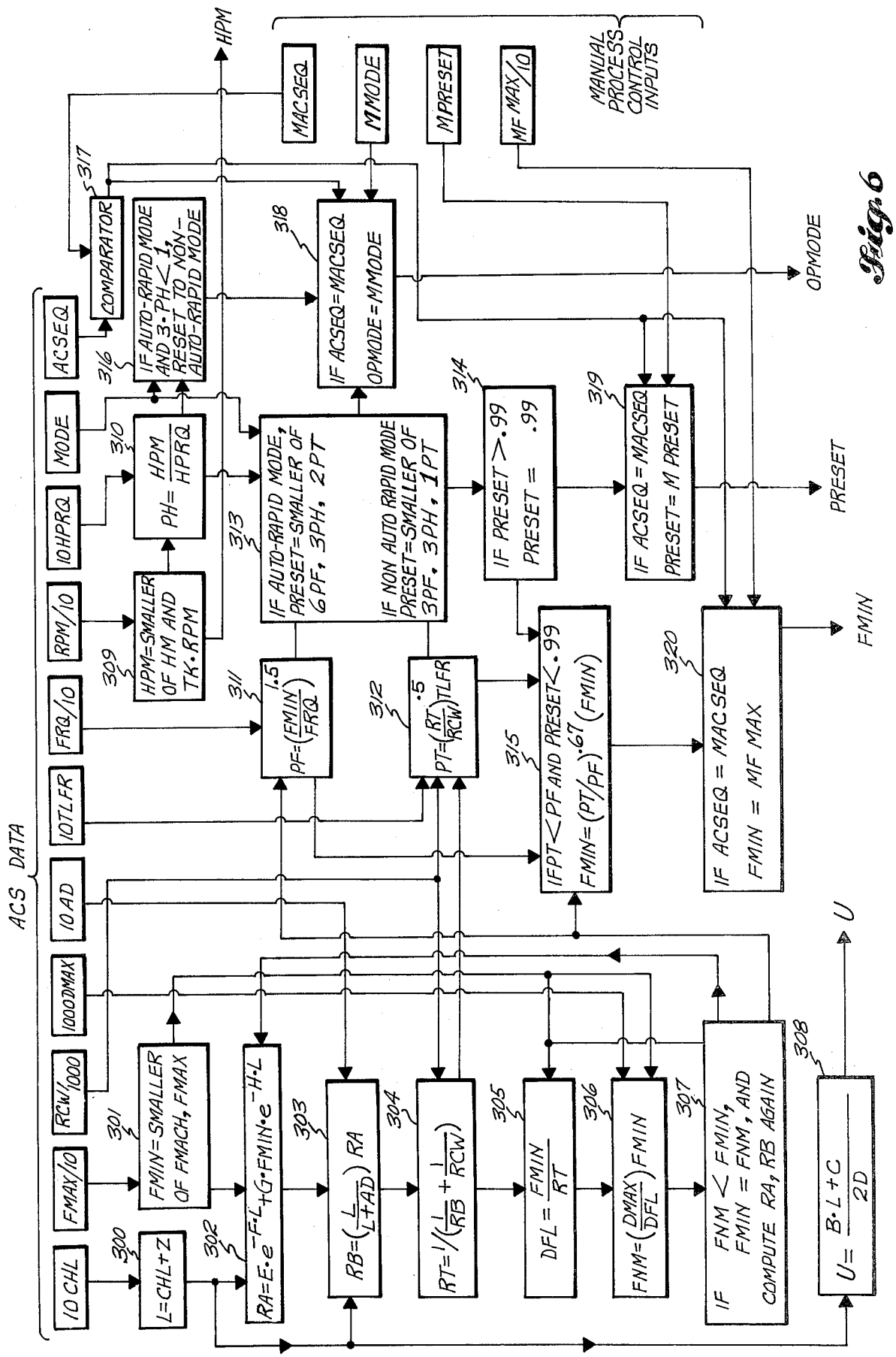

ADAPTIVE CONTROL SYSTEM FOR NUMERICALLY CONTROLLED MACHINE TOOLS

FIELD OF THE INVENTION

The present invention generally relates to the field of numerically-controlled machine tools such as milling machines, and, more particularly, to improved adaptive control systems for such machine tools.

BACKGROUND OF THE INVENTION

Numerically-controlled (N/C) and computer numerically-controlled (CNC) milling machines are well known to the prior art for providing automated milling processes. In both types of machines, the operations of a machine such as spindle position, spindle speed, feedrate of a work piece past the spindle, and so forth, are effected by a sequence of pre-programmed N/C instructions, one for each step of the milling process, which is contained in an N/C storage medium operatively interconnected with an N/C unit for the machine. For N/C milling machines, an N/C tape is used, and for CNC milling machines, central computer storage such as disc storage is used.

Adaptive control systems for modifying the commanded feedrate at each step in the milling process are also well known to the prior art, as typified by U.S. Pat. No. 3,728,595, Apr. 17, 1973, to Adams. In such adaptive control systems, a pre-programmed feedrate is lowered when the actual milling force in a step of the milling process exceeds a pre-programmed reference milling force. The pre-programmed reference milling forces and feedrates are obtained by use of a software routine which takes into consideration data such as the type of material of the work piece, the size of the cutting tool to be utilized, the maximum stock cross section of the work piece to be encountered, and characteristics of the milling machine, such as spindle stiffness, maximum spindle load, and machine horsepower. The set of reference milling forces comprise adaptive control system data and are conveniently combined with the N/C instructions, as are the feedrates, and accordingly placed in the N/C storage medium.

Although such adaptive control systems have greatly increased the productivity of the numerically-controlled milling machines with which they are used, for the reasons detailed in the aforementioned Adams patent, they have certain disadvantages. The modified N/C storage medium including the N/C instructions and adaptive control data has been usable only on the specific numerically-controlled milling machine for which the adaptive control system data was produced, inasmuch as other numerically-controlled milling machines may have widely differing stiffness, cutting load, or horsepower capacities. In many cases, a job providing for a specific milling process may have been originally planned for one type of machine or one particular machine, but rescheduled due to production requirements for another type of machine for which the adaptive control data will not provide acceptable feedrate control.

Also, radical milling conditions unforeseen at the time the adaptive control system data is produced may be encountered during the milling process. In particular, the reference milling force values for each step of the milling process provided by the software routine are highly dependent upon the accuracy of inputs provided by a human programmer relating to type of work piece material and so forth. Such undesirable behavior accordingly requires producing new adaptive control data by re-running the software routine and cannot be corrected at the milling machine itself.

It is accordingly an object of this invention to overcome the disadvantages of the prior art set forth above.

It is a further object of this invention to provide an improved adaptive control system which allows the use of the same adaptive control system data for a specific milling process on all milling machines capable of responding to the N/C storage medium in which the adaptive control system data is contained.

It is another object of this invention to provide such an improved adaptive control system which permits modification of the adaptive control system data at the milling machine without the necessity of reprogramming the N/C storage medium in which the adaptive control system data is contained.

It is yet another object of this invention to provide such an improved adaptive control system for use with numerically-controlled machine tools other than milling machines, including machines providing drilling, reaming, boring, tapping, and other processes.

SUMMARY OF THE INVENTION

Briefly, the preferred embodiment of the invention comprises an improved adaptive control system which is designed for use in combination with a numerically-controlled machine tool. The machine tool includes an N/C unit capable of controlling the machine tool in a sequence of desired operational steps to provide a desired machining process in response to a set of N/C instructions contained in an N/C storage medium and further includes input means responsive to an override signal to modify at least one selected operation of the machine tool. An N/C storage medium is provided which contains a set of N/C instructions for a desired machining process which have been computed for a hypothetical machine tool having a predetermined operational capability. Also included in the N/C storage medium is adaptive control system data including a reference value of at least one selected machining process variable which has been computed for operation of the hypothetical machine tool. The adaptive control system data further includes a plurality of universal adaptive control variables containing information sufficient to allow the reference value of the selected machining process variable to be recomputed in accordance with the operational capability of a specific machine tool. A data reader means is coupled with the N/C storage medium and supplies the set of N/C instructions to the N/C unit and the adaptive control system data to the improved adaptive control system.

The improved adaptive control system includes a storage means including machine constant data representing the operational capability of the specific machine tool with which the improved adaptive control system is utilized. A machining process sensor is coupled with the machine tool for providing an output signal representing the actual value of the selected machining process variable. A set-up means is included which recomputes the reference value in the adaptive control system data in accordance with the universal adaptive control variables and the machine constant data to obtain a new reference value. The new reference value is then compared with the output signal from the machining process sensor in a control means to obtain an override signal which is coupled to the input means of the N/C unit to allow modification of the selected machine tool operation.

The improved adaptive control system is particularly applicable for use with milling machines having at least one rotatable spindle for holding a cutter which engages a workpiece during a milling process. The selected operation of the milling machine which is modified in response to the override signal is then feedrate of the cutter with respect to the workpiece. The machining process variable monitored during the milling process is milling force exerted on the machine's spindle and the machining process sensor comprises a milling force sensor responsive to deflection of the cutter.

Provision is also made for inclusion of a manual process control input means which provides a signal representing an operator-selected reference value of the selected machining process variable. A second storage means is included which has this signal coupled thereto for storing the operator-selected reference value. Means is then provided for supplying the operator-selected reference value to the control means in place of either the reference value from the adaptive control system data or the new reference value computed by the set-up means.

BRIEF DESCRIPTION OF THE DRAWINGS

The invention can perhaps best be understood by reference to the following portion of the specification, taken in conjunction with the accompanying drawings in which:

FIGS. 5A and 5B are flow diagrams illustrating the execution of a sequential set of program instructions utilized by the improved adaptive control system in controlling feedrate during the milling process; and FIG. 6 is a flow diagram illustrating the execution of a sequential set of program instructions utilized by the improved adaptive control system in computing new adaptive control system data from that provided in the N/C storage medium and further in providing at-machine modification of the adaptive control system data.

DESCRIPTION OF A PREFERRED EMBODIMENT

Figure 1:
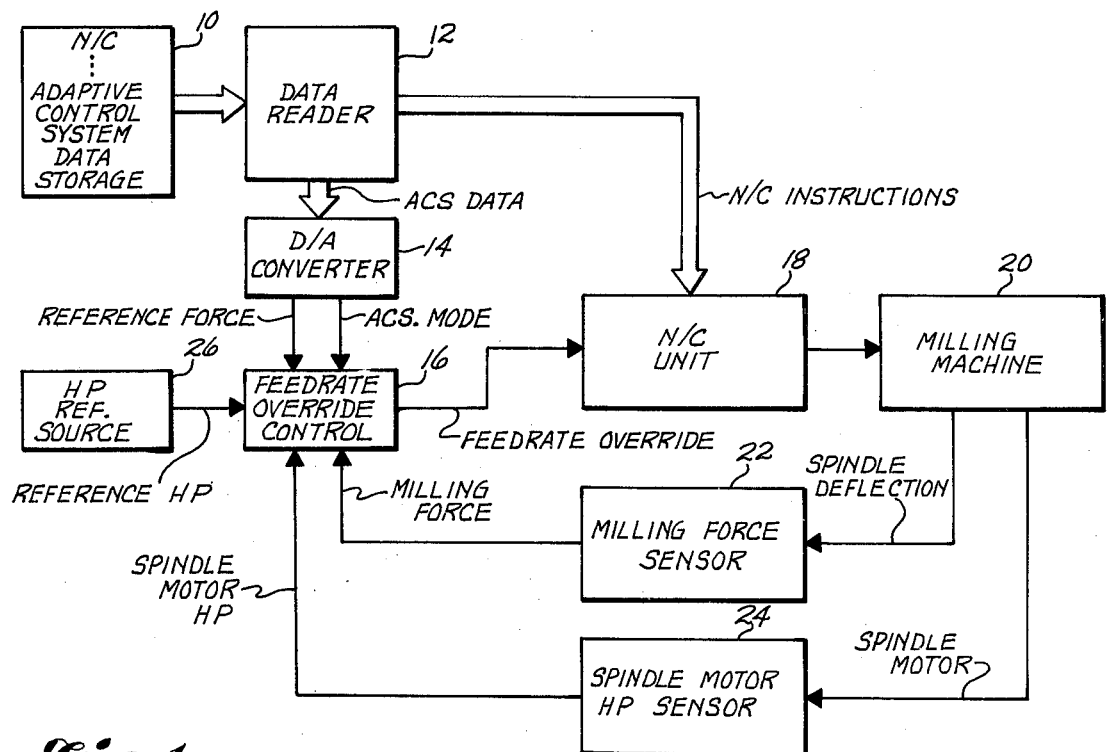
FIG. 1 is a block diagram of a numerically-controlled milling machine with an adaptive control system of the prior art.
Figure 2:
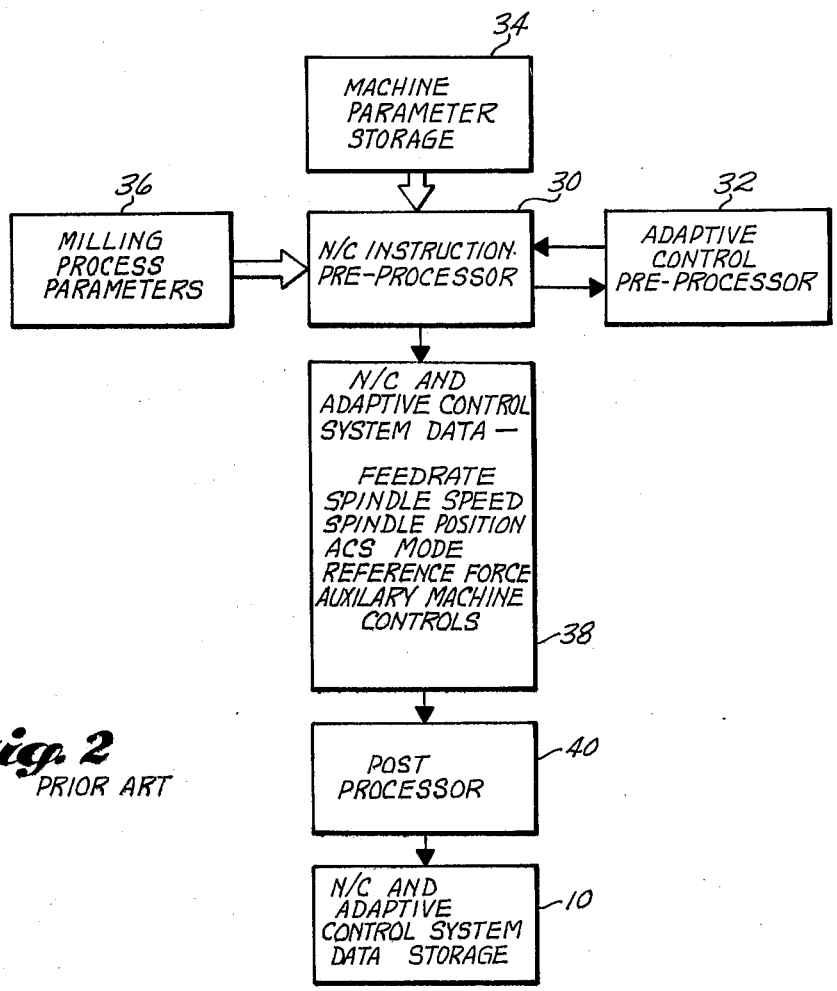
FIG. 2 is a generalized flow diagram illustrating the production of N/C instructions and adaptive control system data in the prior art.

Referring now to FIGS. 1 and 2, the prior art adaptive control systems will be explained in more detail in order to provide a basis for a complete understanding of the present invention.

A storage medium 10 contains the N/C instructions and adaptive control system data and comprises a tape, in the case of N/C milling machines, and other computer data storage, in the case of CNC milling machines. The N/C instructions and adaptive control system data are produced as illustrated in FIG. 2, in which an N/C instruction pre-processor 30, in conjunction with an adaptive control pre-processor 32, utilizes a plurality of milling process parameters 36 provided to the pre-processor 30 by a human programmer and a plurality of machine parameters contained in a machine parameter storage element 34.

The pre-processors 30, 32 generally are embodied in a general purpose digital computer operating under control of a sequential set of program instructions, or software routines, and the machine parameter storage 34 generally comprises storage associated with such a computer. A typical pre-processor 30 known to the prior art is that in which the software routine is identified as "APT system Macro". The milling process parameters 36 are, first, those required by pre-processor 30 in order that a set of N/C instructions may be obtained, for the specific milling process desired, and second, those required by the adaptive control pre-processor 32 to obtain the adaptive control system data necessary to allow feedrate control.

As can be seen in FIG. 2, the pre-processor 30 produces, as listed in block 38, N/C instructions comprising a sequence of spindle position data, for the three coordinate directions associated with one or more spindles of the milling machine, and auxiliary machine control data specifying other operations of the milling machine necessary to achieve the desired milling process, for each step of the milling process. The adaptive control pre-processor 32 is operative, in conjunction with pre-processor 30, to utilize certain ones of the milling process parameters 36 and the machine parameters contained in machine parameter storage 34 to produce additional N/C instructions comprising feedrates and spindle speeds for each step of the milling process. Also produced by the adaptive control pre-processor 32 is the adaptive control system data including adaptive control system mode, such as off, calibrate, and various operating modes, and reference milling force values, again for each step of the milling process. The milling process parameters 36 particularly used by the adaptive control pre-processor 32 include information as to the geometry of the cutter used, the material type and hardness, and information relating to the type of cut to be accomplished. All of this information is provided by a human programmer, with the programmer using both experience and a set of previously-determined guidelines relating to that information. The machine parameters used by the adaptive control pre-processor 32 are those such as stiffness of the machine's spindle assembly, maximum cutting load exertable on the spindle, horsepower of the spindle motor, and so forth and specifically relate to a specific machine or type of machine.

The N/C instructions and adaptive control system data 38 is then run through a post-processor 40, also known to the prior art in the form of a software routine, which adjusts the previously-computed data to ensure safe operation of the milling machine during the milling process. The resultant data is then placed into the storage medium 10 previously described.

Referring now back to FIG. 1, the storage medium 10 is interconnected with a data reader 12 which, in the case of N/C milling machines, is a tape reader, and, in the case of CNC machines, is a data retrieval routine stored in the digital computer. The data reader 12 separates the N/C instructions from the adaptive control system data (hereinafter ACS data) and supplies the ACS data through a D/A converter 14 to a feedrate override control circuit 16. It will therefore be noted that a plurality of analog reference force and adaptive control system mode signals are supplied to feedrate override control circuit 16. The N/C instructions are likewise supplied to the inputs of an N/C unit 18 which in turn controls a milling machine 20 in a manner well known to the prior art to achieve the desired milling process. Included in this control is a control of the machine's feedrate to the value commanded in the N/C instructions.

The adaptive control system of the prior art monitors certain process variables in the milling process to provide a closed-loop system. In particular, the adaptive control system includes a milling force sensor 22 which monitors deflection of each spindle of the milling machine in coordinate radial directions (the X and Y directions) and outputs corresponding analog milling force signals to feedrate control circuit 16. Such a milling force sensor 22 is well known to the prior art and may, for example, comprise that described in U.S. Pat. No. 3,602,090, Aug. 31, 1971, to Whetham. In addition, a spindle motor horsepower sensor 24 is interconnected with each spindle motor and provides output spindle motor horsepower signals to feedrate override control circuit 16. Such a spindle motor horsepower sensor 24 is also well known to the prior art and may, for example, comprise a commercially-available watt transducer. The feedrate override control circuit 16 is also supplied with a reference horsepower signal, representing the maximum horsepower rating of each spindle motor, which is obtained from a horsepower reference source 26.

The feedrate override control circuit 16 includes means for dynamically comparing, in a manner specifically determined by the type of mode signals included in the ACS data, the largest actual milling force on the spindles with the reference force, and the largest actual spindle motor horsepower for the spindle motors with the reference horsepower at and during each step of the milling process. As disclosed in the aforementioned Adams patent, the comparison of milling force with reference force may be a simple summation to produce an error signal representation of the difference therebetween, which error signal is then applied through a controller to develop a first signal representative of a desired percentage reduction in the commanded feedrate for that step in the milling process. Likewise, the comparison of spindle motor horsepower with reference horsepower may also produce an error signal representative of the difference therebetween which error signal is likewise applied through a controller to develop a second signal representative of a desired percentage reduction in the commanded feedrate. Then, means are provided for selecting the smaller of the first and second signals and supplying the selected signal as a feedrate override signal to a feedrate override control input of the N/C unit 18 to effect the desired reduction in the feedrate commanded by the N/C instructions supplied to the N/C unit 18.

It will be recognized by those skilled in the art that inasmuch as the reference force values are computed utilizing the parameters of a given machine, the feedrate override control circuit 16 does not operate to satisfactorily reduce feedrate when the ACS data obtained from storage medium 10 is used in conjunction with a milling machine having differing machine parameters. Likewise, it will be recognized that there is no means provided for altering the reference forces, modes, commanded feedrates, and likewise at the milling machine itself.

Figure 3:
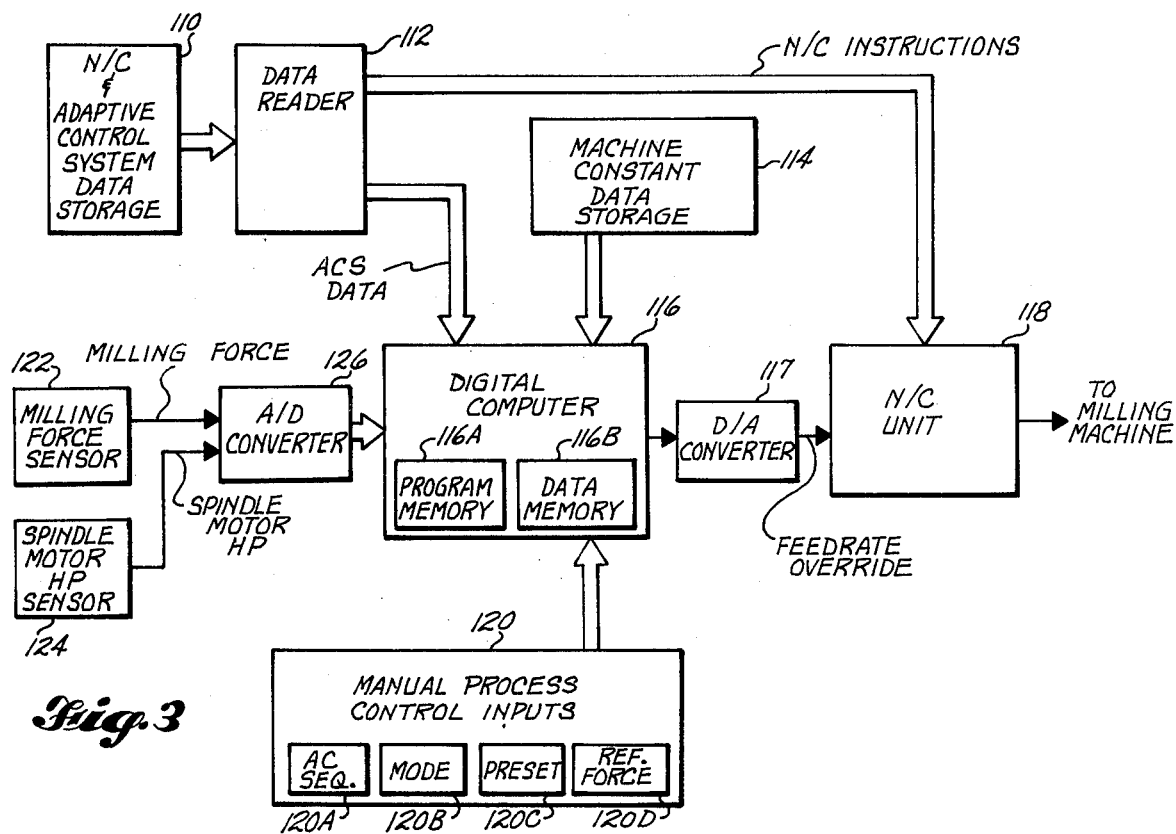
FIG. 3 is a block diagram of a numerically-controlled milling machine with the improved adaptive control system of the present invention.
Figure 4:
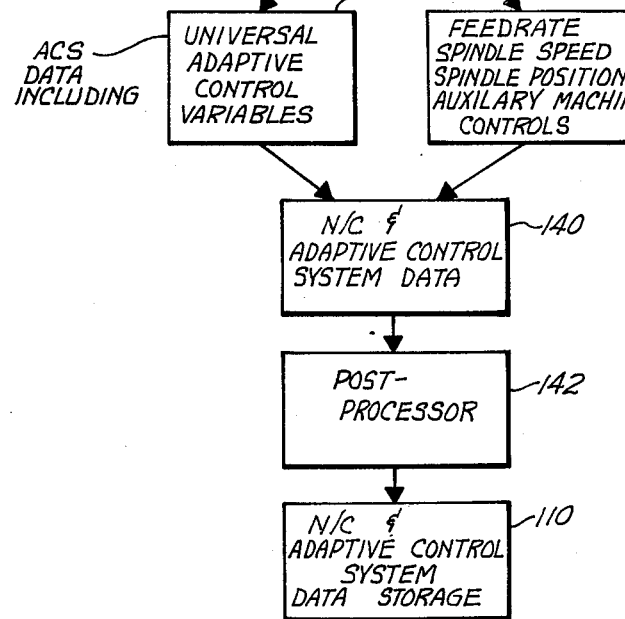
FIG. 4 is a generalized flow diagram illustrating the production of N/C instructions and adaptive control system data for the improved adaptive control system of the present invention.

With reference now to FIGS. 3 and 4, the improved adaptive control system of the present invention (in which is provided universal machine adaptive control system data capability and at-machine editing of the ACS data) will be described for use with milling machines.

Again, a storage medium 110 is provided which includes N/C instructions and ACS data produced as generally illustrated in FIG. 4. An N/C instruction pre-processor 130, which may comprise a general purpose digital computer programmed with a software routine such as "APT system Macro", is operatively interconnected with an adaptive control pre-processor 132 and receives universal machine parameter inputs from a universal machine parameter storage means 134 and additionally receives milling process parameters 136 provided by a programmer. The milling process parameters 136 are identical to the milling process parameters 36 provided in the prior art (FIG. 2); however, the universal machine parameters differ from the machine parameters provided by machine parameter storage 34 of the prior art (FIG. 2) in that the former comprises information relating to the spindle assembly stiffness, spindle horsepower rating, and maximum spindle load of a hypothetical machine that is stiffer, stronger, or more powerful than any numerically-controlled milling machine with which the storage medium 110 will be utilized. Accordingly, the N/C instruction pre-processor 130, and the adaptive control pre-processor 132, function as previously described to provide a plurality of N/C instructions 138 including feedrate, spindle speed, spindle position and auxiliary machine controls for such a hypothetical machine. In addition, the adaptive control preprocessor 132 provides ACS data 139 including reference forces for each step of the milling process, and additionally including universal adaptive control variables which contain information sufficient to allow the ACS data modes and reference forces, and the feedrates in the N/C instructions, to be re-computed by the improved adaptive control system to correspond to the specific milling machine with which the improved adaptive control system is utilized.

Table I hereafter includes a complete identification of the ACS data 139 including the universal adaptive control variables.

TABLE I

| ACS | |
|---|---|
| AC SEQ. | 2 BCD digit ID number range 0–31, used to identify an adaptive control cut sequence, which increases by one for each change in tool or workpiece stock cross section specified when the tape was programmed. |
| MODE | 1 BCD digit, range 0–9. 0 - ACS off 8 - ACS autorapid (normal) 9 - ACS operate without autorapid |
| FMAX/10 | 3 BCD digits, range 000–999 representing 1/10 times reference force in pounds. (0000–9990 lbs.) |
| FRQ/10 | 3 BCD digits, range 000–999 representing 1/10 times predicted milling force at commanded feedrate, (0000–9999 lbs.). |
| 1000 DMAX | 2 BCD digits range 01–99 representing one thousand times allowable deflection of cutter in inches. (.001 to .009 inches) |
| 10HPRQ | 3BCD digits, range 0111–999 representing ten times predicted spindle horsepower required at commanded feedrate. (00.1 to 99.9 HP) |
| 10CHL | 3 BCD digits, range 001–999 representing .001 times combined rigidity (in lbs./inch) of cutter, holder and workpiece. (001000 to 999000 lbs./inch). |
| 10AD | 2 digit BCD number, range 01–99 representing |

TABLE I-continued

ACS

| | |
|---|---|
| | ten times axial length of cut in inches. (0.1 to 9.9 inches) |
| 10TLFR | 3 digit BCD number representing ratio of chip load for optimum cutting efficiency and programmed chip load from software pre-processor. (.1 to 99.9). |
| RPM/10 | 3 BCD digits, range 001–999 representing 10–9990 commanded spindle speed, in rpm. |

Typically, the ACS data 139 is inserted as individual alpha-identified data words in the N/C and adaptive control system data 140 along with the N/C instructions 138. One such data word is provided by the adaptive control pre-processor 132 for every set of separate milling conditions in the desired milling process, and identified by a separate and distinctive adaptive control sequence number [ACSEQ]. In the data 140, a plurality of the ACS data words are typically contained at the beginning of the data, with each data word being preceded by the alpha-identifier and having immediately following the adaptive control sequence number (ACSEQ) and thereafter the values of the remaining variables such as MODE, FMAX/10, and so forth. The adaptive control sequence is then called out at appropriate placed in the N/C instructions where it is to be used by specification of the alpha-identifier followed by the adaptive control sequence number.

The N/C and adaptive control system data 140 is again subjected to a post-processor 142 which adjusts the N/C instructions to assure safe operation of the milling machine and whose outputs are accordingly stored in the storage medium 110.

Referring now back to FIG. 3, a data reader 112 supplies the N/C instructions to an N/C unit 118 operatively interconnected with a specific milling machine, not illustrated, and further supplies the ACS data including the universal adaptive control variables to a digital computer 116. The digital computer 116 is also supplied with milling force and spindle motor horsepower signals from a milling force sensor 122 and a spindle motor horsepower sensor 124, as coupled through an A/D converter 126. Again, the milling force sensor 122 may comprise a deflection sensor similar to that described in the aforementioned Whetham patent, and the spindle motor horsepower sensor 124 may comprise a watt transducer. Of course, one milling force sensor 122 and one spindle motor horsepower sensor 124 will be provided for each spindle and associated motor of the milling machine.

The digital computer 116 provides a digital feedrate override signal output which is coupled through a D/A converter 117 to the feedrate override control input of the N/C unit 118. It will therefore be recognized that the improved adaptive control system also includes a closed-loop feedrate override control system similar to that of the prior art.

The digital computer 116 is also interconnected with a machine constant data storage means 114 which contains information relating to the specific milling machine with which the adaptive control system is utilized.

Table II identifies the machine constants which are contained in machine constant data storage 114.

TABLE II

MACHINE CONSTANTS

Sensor calibration coefficients A, B, C, D to be used with sensor voltage in the computation of force.

TABLE II-continued

MACHINE CONSTANTS

Spindle coefficients E, F, G, H used to compute spindle-bearing stiffness RA.

| | |
|---|---|
| Z | Distance from plane of zero bearing deflection to face of spindle, in inches. |
| TK | Torque constant for a variable speed spindle motor. |
| HM | Horsepower available at the spindle motor. |
| FMACH | Machine spindle force rating, in pounds. |
| $K_H$ | Horsepower sensor constant. |

Digital computer 116 also receives inputs from a manual process control input means 120 which is accessible to the operator of the milling machine for allowing alteration of mode, reference force, and feedrate override during the milling process. Manual process control input means includes, for example, an AC SEQ. control 120A, a MODE control 120B, a PRESET control 120C, and a REF.FORCE control 120D, as well as enter and clear switch controls, not illustrated. The controls 120A, 120C and 120D may conveniently comprise commercially-available, thumb wheel-actuated, numerical indicator controls which provide a digital number output signal corresponding to a decimal number that has been entered by means of the thumb wheel, and control 120B may comprise a multi-position switch and associated output logic means, with each position of the switch corresponding to a selected mode of operation and providing a related output signal from the output logic means.

Table III identifies the specific signals provided to digital computer 116 from the manual process control input means 120.

TABLE III

MANUAL PROCESS CONTROL INPUTS

| BCD Switches: | MACSEQ | 2 BCD digits, range 0–31, representing operator-selected adaptive control sequence number. |
|---|---|---|
| | MMODE | 1 BCD digit, range 0–9, representing operator-selected mode. |
| | MPRESET | 2 BCD digits, range .00–.99, representing operator-selected percentage feedrate factor. |
| | MFMAX/10 | 3 BCD digits, range 000–999, representing 1/10 times operator-selected reference force in pounds (0000 to 9990 pounds) |
| PB Switches: | | Enter manual process control inputs into computer 116; clear manual process control data in data memory of computer 116. |

Digital computer 116 has included therein a program memory 116A in which are stored a plurality of program instructions for both an operating cycle program (illustrated in FIG. 5) and a machine set-up program (illustrated in FIG. 6), hereinafter identified as CRUNCH.

Also included in digital computer 116 is a data memory 116B which stores both internal data words comprising intermediate products of computation utilized in the operate cycle and CRUNCH programs, and output data words from those programs.

Table IV indicates the internal data words utilized in the CRUNCH program.

TABLE IV

CRUNCH INTERNAL DATA WORDS

| L | The distance from the plane of zero bearing deflection to the end of the cutter. |
|---|---|
| RA | Net rigidity of cutter, holder and spindle at the plane of the load centroid. The load centroid is located one-half the axial depth of cut away from the end of the cutter. |
| RB | Net rigidity of cutter, holder and spindle at the end of the cutter. |

TABLE IV-continued
CRUNCH INTERNAL DATA WORDS

| | |
|---|---|
| RT | Net rigidity of cutter, holder, spindle and workpiece. |
| DFL | Deflection of the cutter, holder and spindle at the end of the cutter. |
| FNM | The force required to deflect the cutter to the deflection DMAX. |
| PF | The percentage factor that would be necessary to apply to the commanded feedrate to produce the force FMIN on the cutter. |
| PT | The percentage factor that would be necessary to apply to the commanded feedrate to produce the feedrate for optimum cutting efficiency. |
| HPM | Available spindle horsepower at commanded spindle speed. |
| PH | The percentage factor that would be necessary to apply to the commanded feedrate to produce the horsepower, HPM, on the spindle. |

Table V indicates the output data words from the CRUNCH program.

TABLE V
CRUNCH DATA OUTPUTS

| | |
|---|---|
| FMIN | Reference force 0–9999 lbs. |
| PRESET | Percentage feedrate factor 0–.99. |
| OPMODE | Operating mode as determined by CRUNCH program. |
| U | Constant to be used with sensor voltage in the computation of actual milling force. |
| HPM | Available spindle horsepower at commanded spindle speed. |

Finally, Table VI indicates the internal data words and output data word for the operate cycle program.

TABLE VI
OPERATE CYCLE INTERNAL DATA WORDS & OUTPUT DATA WORD

| | |
|---|---|
| $FORCE_n$ | The instantaneous milling force on the cutter of the $n^{th}$ spindle of an n-spindle machine. |
| FORCE | The highest value of $FORCE_n$ across all spindles. |
| $HP_n$ | The instantaneous horsepower on the $n^{th}$ spindle of an n-spindle machine. |
| HP | The highest value of $HP_n$ across all spindles. |
| FDRT OVRIDE1 | The percentage factor to apply to the commanded feedrate in response to the highest milling force. |
| FDRT OVRIDE2 | The percentage factor to apply to the commanded feedrate in response to the highest spindle horsepower. |
| FDRT OVRIDE | The smaller of FDRT OVRIDE1 and FDRT OVRIDE2. |

Figure 5B:
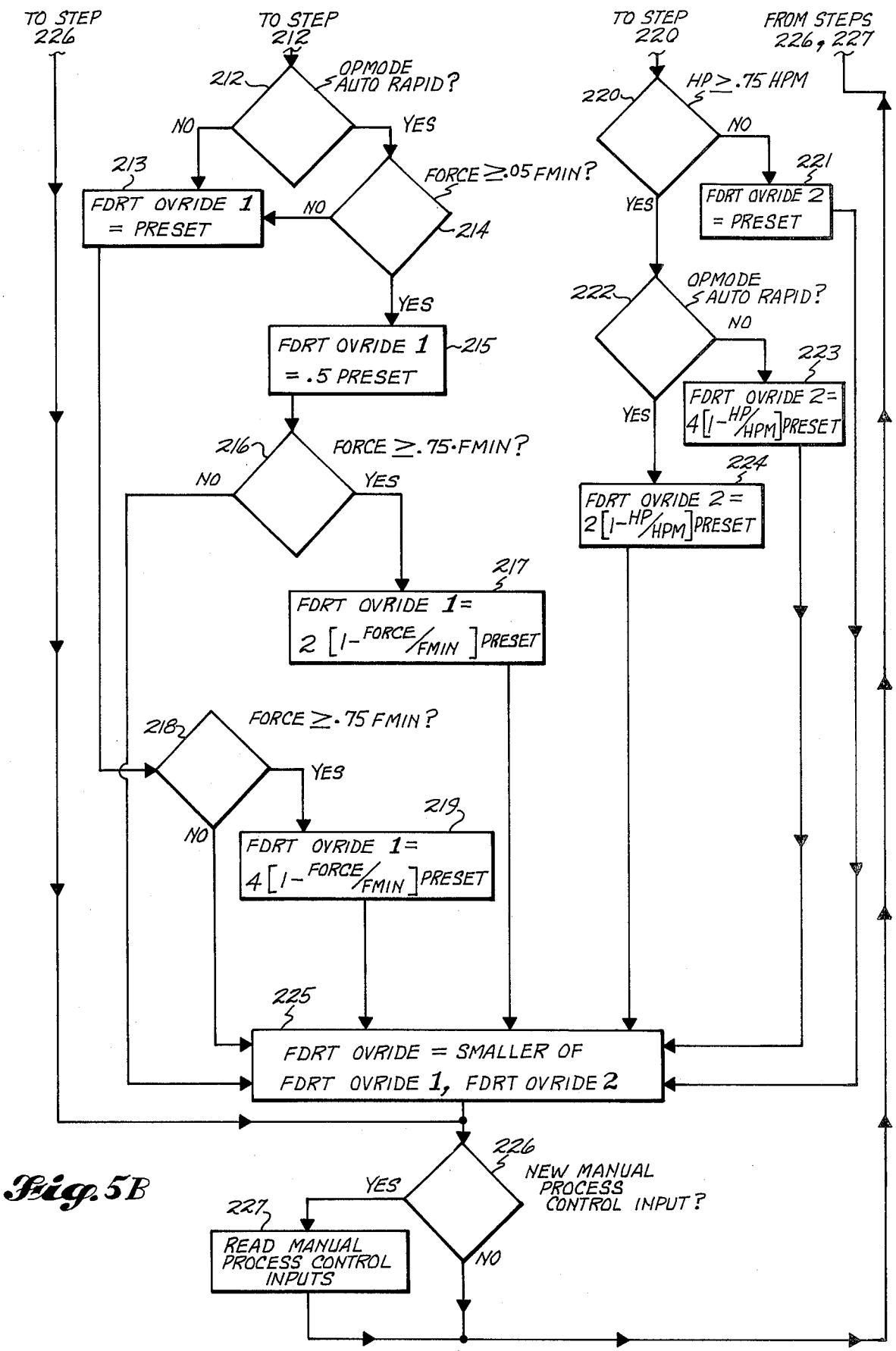

With reference to FIG. 5, operation of the improved adaptive control system is initiated by a START instruction 200 which may be generated from a number of sources, but most typically is located at the beginning of the N/C and adaptive control system data storage medium 110. The operate cycle then investigates, in step 201, as to whether the ACS data has been processed by the CRUNCH program. As previously indicated, the data words comprising the ACS data are typically placed by the programer in the storage medium 110 before the N/C instructions so that the ACS data is processed before the milling process begins. If the ACS data has not been processed, then a branch is made to the CRUNCH program in step 202.

Referring now to FIG. 6, the operation of the CRUNCH program for each data word in the ACS data is illustrated. It will be understood by those skilled in the art that this operation is repeated for every such data word which is identified by a separate adaptive control sequence number (AC SEQ.).

The combined cutter and holder length CHL (obtained from data word 10CHL) is added to the distance from the plane of zero bearing deflection to the face of the spindle (represented by machine constant data word Z) to obtain the data word L representing the distance from the plane of zero bearing deflection to the end of the cutter being utilized in the particular milling process. The plane of zero bearing deflection is that plane taken through the spindle bearings at which no deflection occurs with applied load to the spindle.

The resultant data word L is then utilized, along with machine constant data words B, C and D, in step 308 to compute the output data word U which represents a sensor voltage calibration constant utilized in the computation, in a portion of the operate cycle program to be hereinafter described, of actual milling force from the milling force signal provided by the milling force sensor 122.

The machine constant data words B, C and D used in step 308, and a machine constant data word A used in the operate cycle, represent sensor calibration coefficients which have been previously computed by a calibrating software routine, not illustrated, which takes into consideration the variation in the output voltage of milling force sensor 122 with applied load to a calibration test bar mounted in the tool holder of the milling machine with which the improved adaptive control system is utilized.

The CRUNCH program, in step 301, defines as a reference force (output data word FMIN), the smaller of the spindle force rating for the particular milling machine (machine constant data word FMACH) or the commanded reference force (FMAX, obtained from ACS data word FMAX/10). Thereafter, spindle stiffness is computed for the defined reference force FMIN in order to obtain a measure of the deflection of the cutter, holder and spindle as measured at the end of the cutter so that the actual force required to deflect the cutter to the allowable deflection commanded as a universal adaptive control variable by the programmer in the ACS data can be computed. If the actual force required to deflect the cutter to the allowable deflection is less than the defined reference force FMIN, the CRUNCH program sets the defined reference force FMIN equal to the actual force and recomputes the actual force in one or more iterative steps until the actual force equals or exceeds the reference force in order to obtain a reference force value suitable for the specific milling machine.

Specifically, the CRUNCH program, in step 302, computes the net rigidity of the cutter, holder and spindle at the plane of the load centroid, which is located one-half the actual depth of cut away from the end of the cutter, accordingly to the formula, $$RA = E \cdot e_{-F \cdot L} + G \cdot FMIN \cdot e_{-H \cdot L}$$

This relation is empirically determined and utilizes the machine constant data words E, F, G and H along with the defined reference force FMIN and the data word L. The machine constant data words E, F, G and H represent spindle calibration coefficients which have been previously computed using the calibrating software routine which further takes into consideration the variation in spindle rigidity with applied load to the calibrated test bar.

Thereafter, the CRUNCH program, in step 33, computes the net rigidity, as measured at the end of the cutter, by using the relationship, $$RB = \left(\frac{L}{L + AD}\right) RA$$

This relation utilizes the data word AD (obtained from ACS data word 10AD) representing the actual depth of the cut for the specific milling step in order to convert the rigidity measured at the load centroid of the cut to the rigidity at the end of the cutter.

The deflection of the cutter will also be affected by the rigidity of the cutter, holder and work piece that is being machined. Therefore, in step 304, the CRUNCH program computes the net rigidity of cutter, holder, spindle and workpiece (data word RT) by combining the previously-computed rigidity at the end of the cutter (data word RB) and the universal adaptive control variable representing the workpiece cutter, holder and rigidity (obtained from ACs data word RCW/1000) according to the relationship, $$RT = 1/\left(\frac{1}{RB} + \frac{1}{RCW}\right)$$

The cutter deflection DFL at the end of the cutter due to the defined reference force FMIN is calculated, as indicated in step 305, as the ratio of the reference force FMIN to the net rigidity RT.

The actual force required to deflect the cutter, at its end, to the maximum allowable deflection (data word FNM) is then computed in step 306, which comprises multiplying FMIN by the ratio of allowable deflection DMAX (obtained from ACS data word 1000 DMAX) and the deflection DFL. If the actual force FNM is less than the defined reference force FMIN, the CRUNCH program, in step 307, sets FMIN equal to FNM and interates the process of computing a new FNM until FNM equals or is greater than the reference force selected.

In this manner, the reference force value is adjusted to compensate for the differing stiffness of the particular milling machine from that of the hypothetical milling machine for which the reference force value was first calculated by the adaptive control pre-processor 132.

Now that the reference force (FMIN) has been modified to reflect the parameters of the particular milling machine, it is also desirable to investigate whether the commanded feedrate should also be modified in accordance with that machine's parameters. If the reference force FMIN has been lowered from the value computed by the adaptive control pre-processor 132, (FMAX), it may be desirable to lower the feedrate so that the improved adaptive control system will not be constantly overriding the commanded feedrate, a condition which may be indicative, erroneously, of a dull cutting tool or other undesirable operation of the milling machine.

Therefore, the CRUNCH program includes a plurality of steps which seek to set the commanded feedrate closely approximate to the predicted override value thereof, as determined by the improved adaptive control system, so that feedrate override by a specified percentage of the commanded feedrate is a reliable detection of tool wear conditions at all times.

The CRUNCH program accordingly first computes three feedrate scaling factors PH, PF and PT, related, respectively, to machine horsepower, machine reference force, and optimum machine cutting efficiency.

With respect to the feedrate scaling factor PH, the CRUNCH program, in step 309, computes the data word HPM respresenting the horsepower available at the machine's spindle at the speed of revolution (RPM, obtained from ACS data word RPM/10) commanded for the milling process step. For motors whose spindle horsepower rating is relatively constant over the speed range to be utilized throughout the milling process, HPM will accordingly be equal to the machine constant HM. For variable-horsepower motors whose available spindle horsepower varies as the product of spindle speed and a torque constant represented by machine constant data word TK, the data word HPM will comprise the smaller of the rated horsepower (data word HM) and the product of the torque constant (data word TK) and the commanded speed of spindle revolution (RPM, obtained from ACS data word RPM/10).

In step 310, the feedrate scaling factor PH is computed as the ratio of the data word HPM and the universal adaptive control variable HPRQ representing the predicted spindle horsepower at the commanded feedrate (obtained from ASC data word 10HPRQ).

The feedrate scaling factor PH is therefore horsepower related in allowing modification of the commanded feedrate for a machine having a differing spindle horsepower rating from the hypothetical machine for which the ACS data was produced.

In step 311, the feedrate scaling factor PF is computed as the ratio of the reference force (FMIN) and the universal adaptive control variable FRQ representing the predicted milling force at the commanded feedrate (obtained from ACS data word FRQ/10), the ratio being taken to the 1.5 power, an arbitrarily selected number which has been found to work well in practice. The feedrate scaling factor PF is therefore reference-force-related in allowing modification of the commanded feedrate for a machine having a differing stiffness from the hypothetical machine for which the ACS data was produced.

In step 312, the feedrate scaling factor PT is computed as the ratio of the computed net rigidity (RT) to the universal adaptive control variable RCW representing the combined cutter, holder and workpiece rigidity (obtained from ACS data word RCW/1000), to the 0.5 power, again, an empirically determined value, and as further multiplied by the ratio of chip load for optimum cutting efficiency and the programmed chip load for the specific milling step (TLFR, obtained from ACS data word 10TLFR).

Chip load is defined as the advance of the workpiece into the cutter between contact of successive teeth of the cutter with the workpiece, or, in other words, the feed per tooth of the workpiece with respect to the cutter. The feedrate scaling factor PT is therefore a cutting-efficiency-related factor in allowing modification of the commanded feedrate for a machine having a differing stiffness from the theoretical machine for which the ACS data was produced.

The feedrate scaling factors PF, PH and PT are then weighted in step 313 and compared to ascertain the specific commanded feedrate percentage modifier (data word PRESET) that will be utilized.

More specifically, the ACS data may command that the improved adaptive control system be operated in any one of a plurality of modes, as detailed in Table I, represented by the ACS data word MODE. In step 313, it is assumed that the MODE data word commands either autorapid operation or operate without autorapid operation. For autorapid operation, the adaptive control pre-processor 132 has selected a commanded feedrate which is twice that selected for operate without autorapid operation.

In practical situations, the pre-set processor 132 will normally specify autorapid operation, which allows more rapid transverse of the cutter across air gaps than the operate without autorapid operation due to the higher value of commanded feedrate.

In autorapid operation has been commanded by the ACS data word MODE, the data word PRESET equals the smaller If six times the feedrate scaling factor PF, or three times the feedrate scaling factor PH, or two times the feedrate scaling factor PT. If operate without autorapid operation is commanded by the ACS data word MODE, the data word PRESET equals the smaller of three times the feedrate scaling factor PF, or three times the feedrate scaling factor PH, or one times the feedrate scaling factor PT.

The choice of the specific multipliers to be applied to the feedrate scaling factors PF, PH and PT is afforded by certain design considerations.

With respect to the feedrate scaling factor PF, it is known that N/C units such as the N/C unit 118 have a limited range of feedrate controllability through the feedrate override input. This limited range is typically between 5 percent and 100 percent of the commanded feedrate. Now, the feedrate scaling factor PF may be visualized as representing a minimum feedrate at the reference force value. Accordingly, the multiplier "6" is chosen to insure a dynamic range of feedrate controllability by a factor of 6, i.e., from 100 percent down to approximately 16 percent of commanded feedrate. An additional reduction in the feedrate from approximately 16 percent to 5 percent is then provided for in the operation of the improved adaptive control system to compensate for tool wear and unexpected milling conditions before the 5 percent region of poor feedrate controllability is reached.

For operate without autorapid operation, whose commanded feedrates are ½ of those of the autorapid operation, the multiplier applied to the feedrate scaling factor PF is accordingly ½ that applied for autorapid operation, due to the lesser dynamic range encountered.

As noted hereinafter with respect to the discussion of step 316, the multiplier for the feedrate scaling factor PH in both the autorapid operation and the operate without autorapid operation is limited to "3" because of feedrate calling for more than 3 times the available spindle horsepower cannot be accommodated by the improved adaptive control system due to the time delay restraints upon the spindle horsepower sensor 124.

With respect to the feedrate scaling factor PT, the multiplier is limited to "2" for autorapid operation and "1" for operate without autorapid operation because the in-metal feedrate must not exceed the feedrate for maximum cutting efficiency specified by the feedrate scaling factor PT.

The value of the data word PRESET is then investigated, in step 314, to ascertain if it is greater than 0.99. As will be appreciated by those skilled in the art, it is not desirable to increase the commanded feedrate, even though the specific milling machine is capable thereof in the milling process step under consideration, because of the constraints placed upon feedrate by the post-processor 142 whose computations relating to safety of the machine's operation are not available in the improved adaptive control system. Therefore, if the data word PRESET is in fact greater than 0.99, the CRUNCH program arbitrarily sets the value of the data word PRESET at 0.99.

In step 315 the reference force (FMIN) is modified in the event that the feedrate scaling factor PT is less than the feedrate scaling factor PF and further in the event where the commanded feedrate is to be lowered, i.e., the data word PRESET is less than 0.99. The reduction in reference force (FMIN) in step 315 is accomplished in order to confine the variation in feedrate, due to operation of the improved adaptive control system, between 5% and 100% of commanded feedrate. Specifically, a new value for the reference force (FMIN) equals the ratio of the feedrate scaling factors PT and PF, the ratio being taken to the 0.67 power, again an arbitrarily determined number, as multiplied by the previously-selected value for reference force (FMIN).

In step 316, the data word MODE, if specifying autorapid operation, is also modified under one condition is accordance with machine constants. Specifically, the spindle horsepower sensor 124 cannot instantaneously react to changes in actual spindle horsepower of the associated spindle motor. As a result, a time dealy occurs between spindle motor overload and the reflection of that overload in the spindle motor horsepower single from sensor 124. In autorapid operation, and specifically when air gaps are being traversed, that is, when the milling force is less than 5% of the commanded reference force, the CRUNCH program may call for a feedrate which overloads the spindle motor. Accordingly, when the modification in feedrate due to the feedrate scaling factor PH calls for more than three times the available machine spindle horsepower, i.e., three times the feedrate scaling factor PH is less than 1, the data word MODE is changed to specify operate without autorapid operation.

Assuming now that no manual process control inputs have been entered into the improved adaptive control system, steps 318, 319, and 320 of the CRUNCH program are bypassed. At this time, the ACS data has been processed, resulting in values of the output data words, U, FMIN, PRESET, OPMODE and HPM for each step in the milling process. These values are stored in the data memory 116B of digital computer 116 and each set of values is identified in data memory by the adaptive control sequence number [AC SEQ] to which they relate.

Referring now back to FIG. 5, a branch back to step 203 of the operate cycle program is made in which a test is made to ascertain if the milling process step called for by the N/C instruction specifies a new or different adaptive control sequence than one used in a previous milling process step. If the test is positive, a test is again made, in step 204, to ascertain if the ACS data has been processed. For example, if the ACS data is contained on an N/C tape, it is entirely possible that the tape reading of the ACS data and processing by the CRUNCH program may have not been completed by the time the new adaptive control sequence is called for by the N/C instructions in step 203. Or, the programmer could have placed the ACS data at an intermediate place in tape rather than at the beginning. If the test in step 204 is negative, the CRUNCH program is again entered into, in step 205, in which the ACS data for the selected adaptive control sequence is processed. During the CRUNCH program processing in step 205, the operate cycle program, by means not illustrated, causes the digital computer 116 to provide an output feedrate override signal specifying a predetermined low percentage of commanded feedrate to avoid possible cutter or workpiece damage.

After the completion of step 205, or if the test in step 204 is positive, then a test is made, in step 206, to ascertain if the OPMODE data word output for the adaptive control sequence (ACSEQ) specifies that the improved adaptive control system be off. If the test in step 206 is positive, the operate cycle program shifts to a test, in step 226, as to whether new manual process control inputs have been made. Also, by means not illustrated, the operate cycle program upon a positive test for the off mode causes the digital computer 116 to provide an output feedrate override signal specifying no reduction in the commanded feedrate, therefore allowing the operator to manually override the commanded feedrate by use of a separate feedrate override control provided in the N/C unit 118.

Assuming, however, that the test in step 206 is negative, the operator cycle program enters step 207, in which the outputs of A/D converter 126 representing the digital equivalents of the milling force and spindle motor horsepower signals are read and stored into the data memory 116B of the digital computer 116. The digital milling force and spindle motor horsepower signals are represented as $SV_n$ and $HV_n$, respectively.

As noted in FIG. 5, the milling machine with which the improved adaptive control system is utilized may have more than one spindle, in which case a plurality $n$ of milling force and spindle motor horsepower signals are provided from a corresponding plurality of milling force sensors 122 and spindle motor horsepower sensors 124.

The operate cycle program then utilizes the signals $SV_n$ and $HV_n$ to obtain data representing actual milling force and actual horsepower to be utilized in the improved adaptive control system.

Specifically, in step 208, a plurality of data words $FORCE_n$, each data word representing the force at one spindle of the machine, are computed according to the relationship $$\text{Force}_n = \left( \sqrt{U^2 + \frac{10 \cdot SV_n - A}{D}} \right) - U$$

The computation in step 208 is necessary because the voltage output of the milling force sensor, which is proportional to deflection of the spindle from its axial position, is not linearly related to milling force. Accordingly, the characteristics of the specific sensor must be taken into account (machine constant data words A through D), as must the change in sensor output voltage due to the specific cutter being used (internal data word U), which is affected by the distance from the plane of zero bearing deflection to the end of the cutter (internal data word L).

In step 210, the actual milling force is then represented by the data word FORCE, which comprises the highest or largest value of the plurality of data words $FORCE_n$.

Similarly, a plurality of data words $HP_n$, each data word representing the horsepower being utilized by each of the n spindle motors, are computed in step 209 by multiplying each horsepower signal $HV_n$ by the machine constant data word $K_H$, representing a horsepower sensor constant relation between sensor output and actual horsepower.

In step 211, the actual horsepower (data word HP) is then chosen to be the highest or largest of the plurality of data words $HP_n$.

The operate cycle program then utilizes the actual milling force and actual horsepower values (data words FORCE, HP) in comparisons with reference force and reference horsepower (data words FMIN, HPM), respectively, to effect adaptive control.

With respect to adaptive control based on force comparison, the commanded feedrate is sought to be multiplied, for autorapid operation, by a first feedrate override signal which comprises the value represented by the data word PRESET for actual milling forces ranging between zero and a first predetermined value, which comprises ½ of the value represented by the data word PRESET for actual milling forces between the first predetermined value and a second predetermined value, and which comprises a variable value ranging from ½ the value represented by the data word PRESET to essentially zero for further increases in actual milling forces up to the reference force value represented by data word FMIN.

For operate without autorapid operation, the commanded feedrate is sought to be multiplied by a first override signal which comprises the value represented by the data word PRESET for actual milling forces between zero and the predetermined second value, and which comprises a variable value ranging from the value represented by the data word PRESET to essentially zero for further increases in actual milling forces up to the reference force value.

To control feedrate based on horsepower, the commanded feedrate is sought to be multiplied, in both the autorapid operation and operate without autorapid operation, by a second feedrate override signal which comprises the value represented by the data word PRESET for actual horsepower between zero and a predetermined first value of actual horsepower, and which comprises a variable value ranging from the value represented by the data word PRESET to essentially zero for further increases in actual horsepower up to the available machine horsepower represented by data word HPM.

The operate cycle program then chooses as the actual feedrate override signal the smaller of the first and second feedrate override signals.

Specifically, a test is made, in step 212, to ascertain if the data word OPMODE for the adaptive control sequence commands autorapid operation. If this test is negative, then the operate cycle program, in step 213, sets the data word FDRT OVRIDE 1 equal to the value of the word PRESET.

A test is then made, in step 218, to ascertain if the actual milling force (data word FORCE) is equal to or greater than the predetermined second value of milling force, which, in the preferred embodiment, is a certain percentage, e.g., 75 percent, of the reference force represented by data word FMIN. If the test in step 218 is negative, then the value for FDRT OVRIDE 1 selected in step 213 is supplied to step 225 as the first feedrate override signal.

If the test in step 218 is positive, however, the value of FDRT OVRIDE 1 is further reduced in step 219 according to the relation:

-FDRT OVRIDE 1 = 4[1 − FORCE/FMIN]
  PRESET

It will be appreciated that, as the actual milling force represented by data word FORCE increases from the predetermined second value (0.75 FMIN) to the reference force FMIN, the value of FDRT OVRIDE 1 will be reduced from the value represented by data word PRESET to zero, signifying a proportionate reduction in the commanded feedrate to zero feedrate when the actual milling force equals the reference force (FORCE = FMIN). The coefficient "4" in the above-identified relation is a forward loop gain constant which is chosen with reference to the "break point" constant 0.75, representative of the second predetermined value of milling force, at which a change in the control relation is effected.

In the case, therefore, when the test is step 218 is positive, the value for the data word FDRT OVRIDE 1 computed in step 219 is supplied to step 225 in place of the value computed in step 213.

Returning now to step 212, if the test therein is positive, signifying that autorapid operation has been commanded, a test is then made in step 214 to ascertain if the actual milling force (represented by data word FORCE) is equal to or greater than the predetermined first value of milling force which, in the preferred embodiment, is a certain percentage, e.g., 5 percent, of the reference force (data word FMIN). If the test in step 214 is negative, then a branch is made to step 213 and the selection of the value for FDRT OVRIDE 1 proceeds as previously described. In such a case, of course, the test in step 218 will also be negative. Therefore, the value of FDRT OVRIDE 1 will be the value represented by data word PRESET.

If the test in step 214 is positive, howver, the operate cycle program, in step 215, sets the value for FDRT OVRIDE 1 equal to ½ the value represented by data word PRESET. It will be remembered that autorapid operation is used primarily for traversing air gaps and that the commanded feedrates therefor are twice the commanded feedrates for operate without autorapid operation.

A test is then made in step 216 to ascertain if the actual milling force (data word FORCE) is greater than the predetermined second value, e.g., 0.75 FMIN. If the test in step 216 is negative, then the value for FDRT OVRIDE 1 supplied to step 225 is that selected in step 215. If the test in step 216 is positive, the value of FDRT OVRIDE 1 is further reduced in step 217 according to the relation:

FDRT OVRIDE 1 = 2 [1−FORCE/FMIN] PRESET

It will be noted that the relation in step 217 is the same relation as in 219 with the exception that the gain constant has been changed from "4" to "2" due to the fact that the value for the data word PRESET for autorapid operation is twice that for the data word PRESET for operate without autorapid operation. The value selected in step 217 is then supplied to step 225 as the data word FDRT OVRIDE 1.

The horsepower-based feedrate override signal (data word FDRT OVRIDE2) is computed in a similar manner. In step 220, a test is made to ascertain if the actual horsepower value (data word HP) is greater than the predetermined first value of actual horsepower which, in the preferred embodiment, is a certain percentage, e.g., 75 percent, of the available spindle horsepower represented by data word HPM. If the test in step 220 is negative, then the data word FDRT OVRIDE 2 is set in step 221 to equal the value of the data word PRESET, and is supplied to step 225. If the test in step 220 is negative, however, a test is made in step 222 to ascertain if the data word OPMODE commands autorapid operation. If the test in 222 is negative, then, in step 223, the data word FDRT OVRIDE 2 is computed according to the relation:

FDRT OVRIDE 2 = 4 [1−HP/HPM] PRESET

If the test in step 223 is positive, then the data word FDDRT OVRIDE 2 is computed in step 224 according to the relation

FDRT OVRIDE 2 = 2 [1−HP/HPM] PRESET

The operate cycle program, in step 225, then selects the actual feedrate override signal (data word FDRT OVRIDE) to be the smaller value of the values for data words FDRT OVRIDE 1 and FDRT OVRIDE 2 determined in steps 217 or 219, and steps 223 or 224.

The data word FDRT OVRIDE is then supplied as an output from the digital computer 116 through the D/A converter 117 to comprise the feedrate override signal supplied to the N/C unit 118 which appropriately causes a proportionate reduction in the commanded feedrate supplied as part of the N/C instructions.

In step 226, previously mentioned, the operate cycle program tests for the presence of manual process control input signals from manual process control input means 120. If the test is positive, the operate cycle program in step 227, reads and stores the manual process control inputs in the data memory 116B in digital computer 116, including information as to the adaptive control sequence number (data word MACSEQ), the desired new operating mode therefor (data word MMODE), the desired new percentage reduction in commanded feedrate therefor (data word MPRESET), and the desired new reference force value therefor (data word MFMAX/10). The operate cycle program then loops back to step 201 and repeats the sequence of steps just described in a loop operation through out the milling process. Since the loop through the steps of the operate cycle program takes a very short time (except for the branch-out and branch-back to and from the CRUNCH program), it will be seen that the improved adaptive control system, for each selected adaptive control sequence, continuously computes and controls feedrate during the milling process step or steps using that adaptive control sequence. Further, the operate cycle program permits substantially instantaneous change of the basis of computation and control by the improved adaptive control system to the values specified for a new adaptive control sequence.

Returning now back to the portion of the operate cycle program including steps 201 or 204, it will be noted that the presence of unprocessed manual control process inputs results in a negative test in either of the steps 201 or 204. Accordingly, a branch is made to the CRUNCH program in steps 202 or 205.

Referring to FIG. 6, the CRUNCH program, in step 317, first compares the adaptive control sequence number contained in the ACS data (data word ACSEQ.), with the manual process control input sequence number (data word MACSEQ). When identity between these numbers is realized, the CRUNCH program enters steps 318, 319 and 320. In each of these steps, the values of the data words OPMODE, PRESET and FMIN representing respectively the operating mode, percentage feedrate reduction, and reference force values, are changed to equal those values specified by the data words MMODE, MPRESET, and MFMAX. It will be noted that steps 318, 319 and 320 are the last steps encountered during the CRUNCH program. Accordingly, whenever the adaptive control sequence commanded by the N/C instructions corresponds to the manual process control sequence number, the CRUNCH program will output data words corresponding to the manual process control inputs entered by the operator, rather than the data words previously computed by the CRUNCH program.

The operate cycle program (FIG. 5) will then utilize the manual process control input data words, such as utilizing the manual process control data word for FMIN in steps 214, 216 and 218, the manual process control data word for OPMODE in steps 212 and 222, and the manual process control data word for PRESET in steps 213, 215, 217, 219, 221, 223 and 224.

If the storage medium 110 is used on another numerically-controlled milling machine, or is again used on the same milling machine after another milling process has been effected using a different storage medium, the manual process control data words must be re-entered into the digital computer 116. In this situation, the storage medium 110 may also be modified by use of the N/C instruction pre-processor 130 and the adaptive control preprocessor 132 to incorporate the manual process control data words in storage medium 110. Or, if the storage medium 110 comprises an N/C tape, the manual process control data words may be combined into a plurality of single data words, one such data word being provided for each adaptive control sequence and being preceded by a suitable alpha-identifier and followed by the values for the data words MACSEQ, MMODE, MPRESET, and MFMAX. These alpha-identified data words are then punched or otherwise entered onto the leader of the N/C tape and will be read by the data reader 112 and entered into appropriate locations in the data memory 116B within digital computer 116 for use throughout the milling process. By this latter method, the manual process control data words are automatically inserted into the digital computer 116 whenever and wherever the N/C tape is used.

It will thus be appreciated by those skilled in the art that the improved adaptive control system functions to tailor the commanded reference force, feedrate, and operating mode values contained in the storage medium 110 to the specific milling machine with which the improved adaptive control system is utilized and to further permit calculation of actual miling force being encountered by the milling machine during a specific milling process step, all with reference to machine constants of that milling machine. Further, the improved adaptive control system permits at-site modification of mode, reference force and feedrate values by an operator to compensate for unforeseen milling conditions.

The digital computer 116 and machine constant data storage means 114 may comprise any general-purpose or special purpose computer, and associated storage element, known to the prior art.

In the case of N/C milling machines, the digital computer 116 and the storage means 114 may be provided in the form of integrated circuit microprocessor chips, such as those marketed by Intel Corporation under the name "MCS-8 micro computer system". The digital computer 116 in such a case includes a central processing unit or CPU chip such as the Intel 8008-1, a PROM (programmable read-only memory) chip providing storage for the program memory 116A including the CRUNCH and operate cycle programs, such as the Intel 1702A, a RAM (random-access memory) chip providing storage for the data memory 116B, such as the Intel 2102, a second PROM chip comprising storage means 114, such as the Intel 1702A, various input and output interface chips and other circuit modules for controlling the flow of data to and from the CPU chip with respect to data reader 112, A/D converter 126, storage means 114, input means 120, and D/A converter 117. Also, various indicators and associated interface units, not ilustrated, may be provided to assist the operator in monitoring, and in some cases controlling the operation of the improved adaptive control system.

In the case of CNC milling machines which already include a CNC digital computer, the structure and functions of the storage medium 110, the data reader 112, the N/C unit 118, and all portions of the digital computer 116 may be provided by the CNC computer. In such cases, the D/A converter 117 is not required. It is therefore only necessary to provide necessary input interface units for A/D converter 126 and input means 120, to further set aside CNC computer storage, such as core, disc or tape storage, to comprise machine constant data storage means 114 and the data memory 116B of digital computer 116, and to load the operate cycle and CRUNCH programs into the program memory of the CNC computer.

It will be further appreciated by those skilled in the art that the ACS data in the present invention which allows an N/C storage medium to be used with more than one milling machine and which allows operator-controlled modifications of the adaptive control process can also be applied to numerically-controlled machine tools and processes other than milling machines and milling processes.

For example, adaptive control systems are known to the prior art for controlling machine tools providing drilling and reaming processes. In these systems, actual spindle motor horsepower is compared with rated spindle motor horsepower, in a manner similar to that described above for milling machines, and actual machine torque is compared with a commanded reference torque. The output of such adaptive control systems is again a feedrate override signal.

Accordingly, the ACS data including reference torques can be programmed to take into account the parameters of a hypothetical machine which is stronger than any machine with which the ACS data will be utilized, and to include a set of universal adaptive control variables, such as predicted drilling torque, predicted horsepower, spindle speed, and so forth. An improved adaptive control system is then provided with machine constant storage representing the parameters necessary to tailor the ACS data including reference torques to that for the specific drilling and reaming machine, using the universal adaptive control variables in a set-up program similar to the CRUNCH program discussed herein. In addition, the set-up program would provide a feedrate scaling factor relating to torque (similar to the milling machine feedrate scaling factor PF) and a feedrate scaling factor relating to horsepower (similar to the milling machine feedrate scaling factor PH) to obtain a single percentage feedrate factor [similar to PRESET] necessary to tailor the commanded feedrate to the specific machine.

Adaptive control systems are also known for other machine processes such as boring machines, tapping machines, and pecker-drilling machines to which the present invention would likewise be applicable.

Therefore, those skilled in the art should recognize that the invention is not to be limited to the preferred embodiment discussed herein, but rather is to be interpreted only in light of the appended claims.

We claim:

1. An improved adaptive control system for use in combination with a numerically-controlled machine tool including an N/C unit capable of controlling the machine tool in a sequence of desired operational steps to provide a desired machining process in response to a set of N/C instructions contained in an N/C storage medium, the N/C unit further including input means responsive to an override signal to modify at least one selected operation of the machine tool; an N/C storage medium containing a set of N/C instructions for a desired machining process which have been computed for a hypothetical machine tool having a predetermined operational capability, and further containing adaptive control system data including a reference value of at least one selected machining process variable which has been computed for operation of the hypothetical machine tool, the adaptive control system data further including a plurality of universal adaptive control variables containing information sufficient to allow the reference value of the selected machining process variable to be recomputed in accordance with the operational capability of the specific machine tool; and data reading means coupled with the N/C storage medium for supplying the set of N/C instructions to the N/C unit and the adaptive control system data to the improved adaptive control system, the improved adaptive control system comprising:

a. storage means including machine constant data representing the operational capability of the specific machine tool with which the improved adaptive control system is utilized,
  b. a machining process sensor coupled with the machine tool for providing an output signal representing the actual value of the selected machining process variable,
  c. set-up means recomputing the reference value in the adaptive control system data in accordance with the universal adaptive control variables and said machine constant data to obtain a new reference value,
  d. control means comparing said new reference value with said output signal from said machining process sensor to obtain an override signal, and
  e. means coupling said override signal to the input means of the N/C unit to allow modification of the selected operation of the machine tool.

2. An improved adaptive control system as recited in claim 1, wherein the adaptive control system data contained in N/C storage medium further includes a plurality of reference values for selected operational steps in the desired machining process, and sequence data relating each of said plurality of reference values to the specific operational steps for which said reference value is to be used; wherein said set-up means further recomputes each of said reference values in accordance with the universal adaptive control variables and said machine constant data to obtain a plurality of new reference values; and further comprising means supplying said plurality of new reference values to said control means one at a time in response to the sequence data.

3. An improved adaptive control system as recited in claim 1, further comprising manual process control input means for providing a first signal representing an operator-selected reference value of the selected machining process variable; second storage means having said first signal coupled thereto for storing said operator-selected reference value; and means supplying said operator-selected reference value to said control means in place of said new reference value.

4. An improved adaptive control system as recited in claim 3, wherein the adaptive control system data contained in the N/C storage medium further includes a plurality of reference values for selected operational steps in the desired machining process, and sequence data relating each of said plurality of reference values to the specific operational steps for which said each reference value is to be used; wherein said set-up means further recomputes each of said reference values in accordance with the universal adaptive control variables and said machine constant data to obtain a plurality of new reference values; and further comprising means supplying said plurality of new reference values to said control means one at a time in response to the sequence data; wherein said manual process control input means provides a plurality of said first signals representing a plurality of operator-selected reference values of the selected machining process variable and a plurality of second signals representing operator-selected sequence data relating each of said plurality of first signals to the specific operational steps in the machining process for which the operator-selected reference value is to be utilized; wherein said second storage means is operative to store said plurality of operator-selected reference values and said operator-selected sequence data; and wherein said supplying means comprises means comparing said sequence data includes in the adaptive control system data with said operator-selected sequence data and supplying the corresponding operator-selected reference value to said control means in place of said new reference value upon correspondence between the sequence data and said operator-selected sequence data.

5. An improved adaptive control system as recited in claim 1, wherein the machine tool is a milling machine having at least one rotatable spindle for holding a cutter which engages a workpiece during a milling process; wherein the selected operation of the machine tool which is modified in response to said override signal is feedrate of the cutter with respect to the workpiece; wherein the selected machine process variable is milling force exerted on the machine's spindle during the milling process; and wherein said machining process sensor comprises a milling force sensor responsive to deflection of the cutter.

6. An improved adaptive control system as recited in claim 5, further comprising manual process control input means for providing an input signal representing an operator-selected reference value of milling force; second storage means coupled to said manual process control input means for storing said operator-selected reference value; and means supplying said operator-selected reference value to said control means in place of said new reference value.

7. An improved adaptive control system for use in combination with a numerically-controlled milling machine including an N/C unit capable of controlling the milling machine in a sequence of desired operational steps to provide a desired milling process in response to a set of N/C instructions contained in an N/C storage medium, the N/C unit further including input means responsive to a feedrate override signal to proportionally modify a feedrate of the milling machine's spindle with respect to a workpiece as commanded by a set of N/C instructions; an N/C storage medium containing a set of N/C instructions for a desired milling process which have been computed for a hypothetical milling machine which is stiffer and more powerful than any milling machine with which the N/C storage medium will be used, the set of N/C instructions including a feedrate command designating a predetermined feedrate of the milling machine's spindle with respect to a workpiece during the milling process, the N/C storage medium further containing adaptive control system data including a reference value of milling force exerted on a cutter held in the milling machine's spindle during the milling process, the reference value having been computed for operation of the hypothetical machine tool, the adaptive control system data further including a plurality of universal adaptive control variables containing information sufficient to allow the reference value of milling force to be recomputed in accordance with the operational capability of a specific milling machine; and data reading means coupled with the N/C storage medium for supplying the set of N/C instructions to the N/C unit and the adaptive control system data to the improved adaptive control system, the improved adaptive control system comprising:

a. storage means including machine constant data representing the operational capability, including stiffness, of the specific milling machine with which the improved adaptive control system is utilized, b. a milling force sensor coupled with the milling machine for providing an output signal representing the actual value of milling force during the milling process, c. set-up means recomputing the reference value of milling force in the adaptive control system data in accordance with the universal adaptive control variables and said machine constant data to obtain a new reference value, d. control means comparing said new reference value with said output signal from said milling process sensor to obtain a first feedrate override signal, and e. means coupling said first feedrate override signal to the input means of the N/C unit to allow modification of the feedrate command in the set of N/C instructions during operation of the milling machine.

8. An improved adaptive control system as recited in claim 7, wherein the adaptive control system data contained in the N/C storage medium further includes a plurality of reference values for selected operational steps in the desired milling process, and sequence data relating each of said plurality of reference values to the specific operation steps in the milling process for which said each reference value is to be used; wherein said set-up means further recomputes each of said reference values in accordance with the universal adaptive control variables and said machine constant data to obtain a plurality of new reference values; and further comprising means supplying said plurality of new reference values to said control means one at a time in response to the sequence data.

9. An improved adaptive control system as recited in claim 8, wherein said set-up means computes a plurality of feedrate scaling factors in accordance with the universal adaptive control variables and said machine constant data, one such feedrate scaling factor being provided for each operational step of the milling process identified by said sequence data; and further comprising multiplying means modifying said first feedrate override signal by said plurality of feedrate scaling factors, one at a time in response to said sequence data.

10. An improved adaptive control system as recited in claim 9 further comprising: manual process control input means for providing a plurality of first signals representing a plurality of operator-selected reference values of milling force, a plurality of second signals representing a plurality of operator-selected feedrate scaling factors, and a plurality of third signals representing operator-selected sequence data relating each of said plurality of first and second signals to the specific operational steps in the milling process for which the operator-selected reference values of milling force and operator-selected feedrate scaling factors are to be used; a second storage means operative to store said plurality of operator-selected reference values, said plurality of operator-selected feedrate scaling factors, and said operator-selected sequence data; and means comparing said sequence data included in the adaptive control system data with said operator-selected sequence data and supplying said plurality of operator-selected feedrate scaling factors to said control means and to said multiplying means in place of said new reference values and said feedrate scaling factors upon correspondence between the sequence data and said operator-selected sequence data.

11. An improved adaptive control system as recited in claim 7, further comprising: a spindle motor horsepower sensor providing a second output signal representing actual horsepower output of the milling machine's spindle motor; a source of a reference horsepower signal; second control means comparing said reference horsepower signal with said second output signal to provide a second feedrate override signal; and means coupling the smaller of said first and said second feedrate override signals to the N/C unit as a feedrate override signal.

12. An improved adaptive control system as recited in claim 11, wherein the universal adaptive control variables in the adaptive control system data include predicted spindle horsepower of the milling machine's spindle motor at the feedrate designated by the feedrate command in the set of N/C instructions; wherein said machine constant data includes the available horsepower of such specific milling machine's spindle motor; wherein said set-up means further computes a horsepower-related feedrate scaling factor from said predicted spindle horsepower and said available horsepower; and further comprising multiplyng means modifying said first and second feedrate override signals by said horsepower-related feedrate scaling factor.

13. An improved adaptive control system as recited in claim 7, wherein the universal adaptive control variables in the adaptive control system data include predicted milling force at the feedrate designated by the feedrate command in the set of N/C instructions; wherein said set-up means further computes a reference-force-related feedrate scaling factor from said predicted milling force and said new reference force; and further comprising multiplying means modifying said first feedrate override signal by said reference-force-related feedrate scaling factor.

14. An improved adaptive control system as recited in claim 7, wherein said machine constant data includes a spindle force rating of said specific milling machine; and wherein said set-up means further computes as said new reference value, the smaller of said spindle force rating and the reference value of milling force in the adaptive control system data.

15. An improved adaptive control system as recited in claim 7, wherein the universal adaptive control variables in the adaptive control system data include an allowable deflection DMAX of the cutter, a length CHL of the cutter and a tool holder, a combined rigidity RCW of the cutter, holder and workpiece, and an axial length AD of the cut; wherein said machine constant data includes a plurality of spindle stiffness values for said specific milling machine, and a distance Z from the plane of zero-bearing deflection to the face of the spindle; wherein said set-up means further computes:
  a. a distance L from the plane of zero-bearing deflection to the end of the cutter using said length CHL and said distance Z,
  b. a net rigidity RA of cutter, holder and spindle at the plane of the load centroid using said spindle stiffness coefficients, said new reference value, and said distance L,
  c. a net rigidity RB of cutter, holder and spindle at the end of the cutter using said net rigidity RA, said distance L and said axial length AD,
  d. a net rigidity RT of cutter, holder, spindle and workpiece using said net rigidity RB and said combined rigidity RCW,
  e. a deflection DFL of the cutter, holder and spindle at the end of the cutter using said net rigidity RT and said new reference value, and
  f. a force FMN required to deflect the cutter to the allowable deflection DMAX using said allowable deflection DMAX, said deflection DFL, and said new reference value; and
  wherein said set-up means further compares said force FNM with said new reference value and, if said force FNM is less than said new reference value, sets said new reference value equal to said force FNM and recomputes said net rigidity RA, said net rigidity RB, said net rigidity RT, said deflection DFL and said force FNM until said new reference value is equal to or less than said force FNM.

16. An improved adaptive control system as recited in claim 15, wherein the universal adaptive control variables and the adaptive control system data include predicted milling force at the feedrate designated by the feedrate command in the set of N/C instructions; wherein said set-up means further computes a reference-force-related feedrate scaling factor from said predicted milling force and said new reference force; and further comprising multiplying means modifying said first feedrate override signal by said reference-force-related feedrate scaling factor.

17. An improved adaptive control system as recited in claim 15, wherein the universal adaptive control variables in the adaptive control system data include a ratio of chip load for optimum cutting efficiency and programmed chip load for the milling process, wherein said set-up means further computes a cutting-efficiency-related feedrate scaling factor from said chip load ratio, said net rigidity RT and said combined rigidity RCW; and further comprising multiplying means modifying said first feedrate override signal by said cutting-efficiency-related feedrate scaling factor.

18. An improved adaptive control system as recited in claim 17, wherein the universal adaptive control variables in the adaptive control system data include predicted milling force at the feedrate designated by the feedrate command in the set of N/C instructions; wherein said set-up means further computes a reference-force-related feedrate scaling factor from said predicted milling force and multiplies said reference-force-related feedrate scaling factor by a first predetermined number greater than unity to obtain a resultant reference-force-related feedrate scaling factor; and wherein said multiplying means modifies said first feedrate override signal by the smaller of said resultant reference-force-related and said cutting-efficiency-related feedrate scaling factors.

19. An improved adaptive control system as recited in claim 18, further comprising a spindle motor horsepower sensor providing a second output signal representing actual horsepower output of the milling machine's spindle motor; a source of a reference horsepower signal; a second control means comparing said reference horsepower signal with said second output signal to provide a second feedrate override signal; wherein the universal adaptive control variables in the adaptive control system data include predicted spindle horsepower of the milling machine's spindle motor at the feedrate designated by the feedrate command in the set of N/C instructions; wherein said machine constant data includes the available horsepower of said specific milling machine spindle motor; wherein said set-up means further computes a horsepower-related feedrate scaling factor from said predicted spindle horsepower and said available horsepower; wherein said set-up means multiplies said horsepower-related feedrate scaling factor by a second predetermined number greater than unity to obtain a resultant horsepower-related feedrate scaling factor; wherein said multiplying means modifies said first and second feedrate override signals by the smallest of said resultant reference-force-related, said cutting-efficiency related and resultant horsepower-related feedrate scaling factors; and further comprising means coupling the smaller of said first and said second feedrate override signals to the N/C unit as a feedrate override signal.

20. An improved adaptive control system for use in combination with a numerically-controlled machine tool including an N/C unit capable of controlling the machine tool in a sequence of desired operational steps to provide a desired machining process in response to a set of N/C instructions contained in an N/C storage medium, the N/C unit further including input means responsive to an override signal to modify at least one selected operation of the machine tool; an N/C storage medium containing a set of N/C instructions for a desired machining process which have been computed for a hypothetical machine tool having a predetermined operational capability, and further containing adaptive control system data including a reference value of at least one selected machining process variable which has been computed for operation of the hypothetical machine tool; and data reading means supplying a set of N/C instructions to the N/C unit and the adaptive control system data to the improved adaptive control system, the improved adaptive control system comprising:

a. a machining process sensor coupled with the machine tool for providing an output signal representing the actual value of the selected machining process variable, b. manual process control input means for providing a first signal representing an operator-selected reference value of the selected machining process variable, c. storage means having said first signal coupled thereto for storing said operator-selected reference value, d. control means comparing said reference value with said output signal from said machining process sensor to obtain an override signal, e. means supplying said operator-selected reference value to said control means in place of said reference value, and f. means coupling said override signal to the input means of the N/C unit to allow modification of the selected operation of the machine tool.

21. An improved adaptive control system as recited in claim 20, wherein the adaptive control system data contained in the N/C storage medium further includes a plurality of reference values for selected operational steps in the desired machining process, and sequence data relating each of said plurality of reference values to the specific operational steps for which said each reference value is to be used; further comprising means supplying said plurality of reference values to said control means one at a time in response to the sequence data; wherein said manual process control input means provides a plurality of said first signals representing a plurality of operator-selected reference values of the selected machining process variable and a plurality of second signals representing operator-selected sequence data relating each of said plurality of first signals to the specific operational steps in the machining process for which the operator-selected reference value represented by said each first signal is to be used, wherein said storage means is operative to store said plurality of operator-selected reference values and said operator-selected sequence data; and wherein said supplying means comprises means comparing said sequence data included in the adaptive control system data with said operator-selected sequence data and supplying the corresponding operator-selected reference value to said control means in place of said reference value upon correspondence between the sequence data and said operator selected sequence data.

22. An improved adaptive control system as recited in claim 20, wherein the machine tool is a milling machine having at least one rotatable spindle for holding a cutter which engages a workpiece during a milling process; wherein the selected operation of the machine tool which is modified in response to said override signal is feedrate of the cutter with respect to the workpiece; wherein the selected machine process variable is milling force exerted on the machine's spindle during the milling process; and wherein said machining process sensor comprises a milling force sensor responsive to deflection of the cutter.

23. An improved adaptive control system as recited in claim 22, wherein the adaptive control system data contained in the N/C storage medium further includes a plurality of reference values for selected operational steps in the desired milling process, and sequence data relating each of said plurality of reference values to the sepcific operational steps in the milling process for which said each reference value is to be used; further comprising means supplying said plurality of reference values to said control means one at a time in response to the sequence data; wherein said manual process control input means further provides a plurality of said first signals representing a plurality of operator-selected reference values of milling force, a plurality of second signals representing a plurality of operator-selected feedrate scaling factors, and a plurality of third signals representing operator-selected sequence data relating each of said plurality of first and second signals to the specific operational steps in the milling process for which the operator-selected reference values of milling force and operatorselected feedrate scaling factors are to be used; wherein said storage means is operative to store said plurality of operator-selected reference values, said plurality of operator-selected feedrate scaling factors, and said operator-selected sequence data; further comprising multiplying means modifying said override signal by said plurality of operator-selected feedrate scaling factors one at a time in response to said operator-selected sequence data; and wherein said supplying means comprises means comprising said sequence data included in the adaptive control system data with said operator-selected sequence data and supplying the corresponding operatorselected reference value to said control means in place of said reference value upon correspondence between the sequence data and said operatorselected sequence data.

* * * * *

UNITED STATES PATENT AND TRADEMARK OFFICE
CERTIFICATE OF CORRECTION

PATENT NO. : 4,078,195
DATED : March 7, 1978
INVENTOR(S) : Richard A. Mathias et al.

It is certified that error appears in the above-identified patent and that said Letters Patent are hereby corrected as shown below:

Column 6, TABLE I, between lines 62 and 63: "009" is changed to --099--.

Column 7, line 26: "placed" is changed to --places--.

Column 9, line 53: "programer" is changed to --programmer--.

Column 10, line 55: the equation is changed to read $$RA = E \cdot e^{-F \cdot L} + G \cdot FMIN \cdot e^{-H \cdot L}$$

Column 11, line 36: "interates" is changed to --iterates--.

Column 13, line 6: "transverse" is changed to --traverse--.

Column 13, line 9: "In" is changed to --If--

Column 13, line 11: "If" is changed to --of--.

Column 13, line 47: "of" is changed to --a--.

Column 14, line 18: "is" (second occurrence) is changed to --in--.

Column 14, line 22: "dealy" is changed to --delay--.

UNITED STATES PATENT AND TRADEMARK OFFICE
CERTIFICATE OF CORRECTION

PATENT NO. : 4,078,195
DATED : March 7, 1978
INVENTOR(S) : Richard A. Mathias et al.

It is certified that error appears in the above-identified patent and that said Letters Patent are hereby corrected as shown below:

Column 17, line 33: "howver" is changed to —however—.

Column 18, line 42: "through out" is changed to —throughout—.

Column 21, line 59: —the— is inserted before "N/C".

Column 21, line 63: —each— is inserted after "said".

Column 22, line 38: "includes" is changed to —included—.

Column 24, line 29: —reference values and said operator-selected— is inserted after "operator-selected".

Column 24, line 57: "multiplyng" is changed to —multiplying—.

Column 25, lines 6-7: "as said new reference value" is deleted.

Column 25, line 9: —as said new reference value— is inserted after "data".

Column 25, line 14: "a tool" is changed to —tool—.

Column 25, line 24: —the— is inserted before "cutter".

Column 25, line 28: —the—is inserted before "cutter".

Column 25, line 31: —the— is inserted before "cutter.

Column 27, line 49: "operator selected" is changed to —operator-selected—.

Column 28, line 19: "sepcific" is changed to —specific—.

UNITED STATES PATENT AND TRADEMARK OFFICE
CERTIFICATE OF CORRECTION

PATENT NO. : 4,078,195
DATED : March 7, 1978
INVENTOR(S) : Richard A. Mathias et al.

It is certified that error appears in the above-identified patent and that said Letters Patent are hereby corrected as shown below:

Column 28, line 33: "operatorselected" is changed to —operator-selected—.

Column 28, line 42: "comprising" is changed to —comparing—.

Column 28, line 45: "operatorselected" is changed to —operator-selected—.

Column 28, line 48: "operatorselected" is changed to —operator-selected—.

Signed and Sealed this

Twelfth Day of September 1978

[SEAL]

Attest:

RUTH C. MASON
*Attesting Officer*

DONALD W. BANNER
*Commissioner of Patents and Trademarks*